(No Model.)

E. BUTLER.
MOTION CONVERTING MECHANISM.

No. 285,223. Patented Sept. 18, 1883.

Witnesses:

H. W. Wells.

George C. Plummer.

Inventor,

Edwin Butler per A. B. Upham,
Attorney in fact.

N. PETERS. Photo-Lithographer. Washington. D. C.

UNITED STATES PATENT OFFICE.

EDWIN BUTLER, OF TOULON, ILLINOIS.

MOTION-CONVERTING MECHANISM.

SPECIFICATION forming part of Letters Patent No. 285,223, dated September 18, 1883.

Application filed February 13, 1883. (No model.)

*To all whom it may concern:*

Be it known that I, EDWIN BUTLER, of Toulon, in the county of Stark, in the State of Illinois, have invented an Improved Motion-Converting Mechanism; and I do hereby declare that the following is a full, clear, and exact description thereof, reference being had to the annexed drawings, making a part of this specification, in which like letters of reference refer to like parts, and in which—

Figure 1:
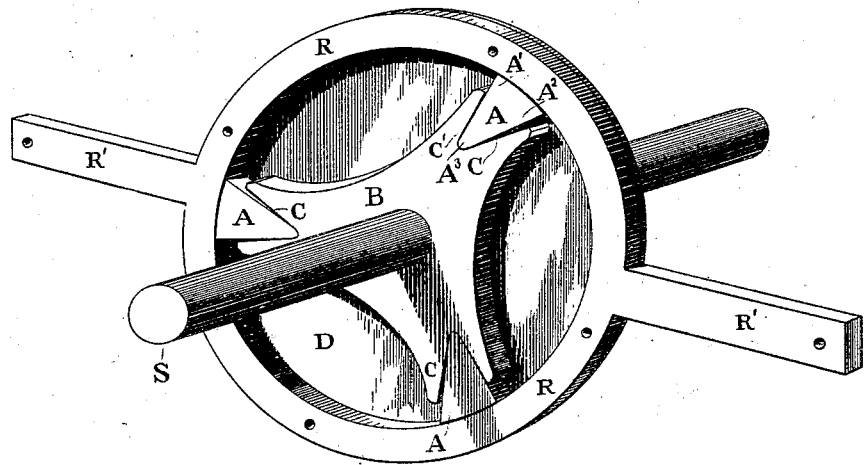
Figure 2:
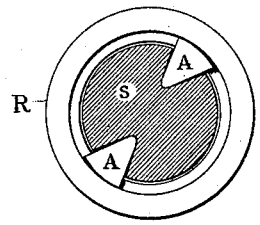

Figure 1 represents a perspective view; Fig. 2, a modification.

The object of this invention is the construction of a device for converting a reciprocating motion into a continuous rotary motion; and it consists, essentially, of a shaft, an oscillatory ring concentric therewith, and friction-pawls secured to said shaft in such a way that they shall slip along the inside surface of said ring when it is oscillated in one direction, but shall bind and rotate the shaft when turned in the opposite direction.

In the drawings, S represents the shaft, having suitable bearings. (Not shown.) Upon this shaft S is keyed, screwed, or otherwise rigidly fastened the collar B, having two or more V-shaped notches, C. In the same plane with this collar B, and concentric with the said shaft S, is the ring R, having one or two arms, R' R'. A face-plate or thin disk, D, at each side of said ring and collar B, and having central openings or bearings through which passes the shaft S, serves to retain said ring R upon said shaft. In the drawings one of the face-plates is removed to show the collar B and pawls A. Within the said notches C, which are so made as to have the same side of each in line with the center of the shaft, I place V-shaped friction-pawls A, slightly narrower than said notches. The vertex of each pawl A is rounded to better resist the pressure thereat, and the curve of the base is of a shorter radius than the inside circle of the ring B. The center of curvature of said base being exactly or approximately in line with the side A' of each pawl, the side $A^2$ is therefore the longer of the two, and as the ring R passes by each pawl from A' to $A^2$ there is no tendency for the same to bind between said ring and the notched collar B; but upon the instant of the reversal of the ring's movement the longer diameters of the curve of said pawl's base come in contact with the inside face of said ring R, so binding said pawl between said face and the bottom of the notch C that the collar B and its attached shaft S are rotated through an arc equal to the ring's oscillation. In case the shaft S is vertical, the pawls A lie upon that face-plate D which is below, and are thereby made to engage with the face of the ring R, since said face-plate moves with the ring.

What I claim as my invention, and for which I desire Letters Patent, is as follows, to wit:

1. In a device for converting oscillatory into continuous rotary motion, a shaft having a V-shaped notch, C, in it or in a projection therefrom, in combination with a triangular pawl, A, and a ring, R, substantially as and for the purpose specified.

2. The shaft S and collar B, having one or more notches, C, in combination with one or more triangular pawls, A, ring R, and means for preventing longitudinal displacement of said ring and pawls relative to said shaft, substantially as and for the purpose herein set forth.

3. The ring R, having one or more arms, R', and the face-plates D D, in combination with the pawls A, notched collar B, and shaft S, substantially as and for the purpose specified.

In testimony that I claim the foregoing invention I have hereunto set my hand this 9th day of February, 1883.

EDWIN BUTLER.

Witnesses:
ORLANDO BRACE,
WILLIAM W. WRIGHT.